(12) United States Patent
Sakai

(10) Patent No.: US 8,930,080 B2
(45) Date of Patent: Jan. 6, 2015

(54) DRIVER STATE ESTIMATION DEVICE

(75) Inventor: Hideki Sakai, Susono (JP)

(73) Assignee: Toyota Jidosha Kabushiki Kaisha, Aichi-Ken (JP)

( * ) Notice: Subject to any disclaimer, the term of this patent is extended or adjusted under 35 U.S.C. 154(b) by 1017 days.

(21) Appl. No.: 12/678,245

(22) PCT Filed: Aug. 7, 2009

(86) PCT No.: PCT/JP2009/064022
§ 371 (c)(1),
(2), (4) Date: Mar. 15, 2010

(87) PCT Pub. No.: WO2010/024109
PCT Pub. Date: Mar. 4, 2010

(65) Prior Publication Data
US 2010/0211268 A1    Aug. 19, 2010

(30) Foreign Application Priority Data
Aug. 28, 2008 (JP) ................................ 2008-219789

(51) Int. Cl.
*B60W 40/09* (2012.01)

(52) U.S. Cl.
CPC ................................. *B60W 40/09* (2013.01)
USPC ........................................ 701/42; 180/446

(58) Field of Classification Search
CPC ............................ B62D 6/008; B62D 15/0245
USPC ............................................ 701/42; 180/446
See application file for complete search history.

(56) References Cited

U.S. PATENT DOCUMENTS 5,957,987 A *  9/1999  Sudo et al. ...................... 701/41
2004/0188172 A1 *  9/2004  Asada ............................ 180/446

(Continued)

FOREIGN PATENT DOCUMENTS

CN    2823083 Y    10/2006
CN    1907786 A    2/2007

(Continued)

OTHER PUBLICATIONS

International Preliminary Report on Patentability for corresponding International Patent Application No. PCT/JP2009/064022 mailed Apr. 21, 2011.

(Continued)

*Primary Examiner* — John Q Nguyen
*Assistant Examiner* — Rodney P King
(74) *Attorney, Agent, or Firm* — Sughrue Mion, PLLC

(57) ABSTRACT

A driver state estimation device 1 includes a steering angle sensor 2 detecting a steering angle of a steering, a steering torque sensor 3 detecting steering torque applied to the steering, and an ECU 4 having a steering angle estimation unit 5 and a driver state estimation unit 6. The steering angle estimation unit 5 is input with a steering angle (steering angle detected value) MA detected by the steering angle sensor 2 and steering torque (steering torque detected value) MT detected by the steering torque sensor 3, determines whether the steering angle detected value MA is 0 or not, when the steering angle detected value MA is 0, calculates a steering angle estimated value MAest by multiplying the steering torque detected value MT by the gradient of the steering angle (proportionality coefficient) α with respect to the steering torque, and when the steering angle detected value MA is not 0, sets the steering angle detected value MA as the steering angle estimated value MAest.

5 Claims, 6 Drawing Sheets

(56) References Cited

U.S. PATENT DOCUMENTS

| | | | |
|---|---|---|---|
| 2005/0021204 A1* | 1/2005 | Kudo | 701/36 |
| 2007/0225885 A1* | 9/2007 | Hara et al. | 701/43 |
| 2008/0262676 A1* | 10/2008 | Kawakami et al. | 701/41 |

FOREIGN PATENT DOCUMENTS

| | | |
|---|---|---|
| JP | 59-153629 A | 9/1984 |
| JP | 07-009879 A | 1/1995 |
| JP | 08-268190 A | 10/1996 |
| JP | 2002-036905 A | 2/2002 |

OTHER PUBLICATIONS

Chinese Office Action issued in corresponding Chinese Patent Application No. 200980100461.3, dated Aug. 31, 2012.

* cited by examiner

DRIVER STATE ESTIMATION DEVICE

TECHNICAL FIELD

The present invention relates to a driver state estimation device for estimating a driving state of a driver on the basis of a steering operation state.

BACKGROUND ART

As described in Patent Literature 1, a driver state estimation device is known in which a steering angle error between an estimated value of a steering angle on an assumption that a steering operation is smoothly performed and a steering angle detected by a steering angle sensor is calculated, and a driving operation state is monitored on the basis of the distribution of the steering angle error.

CITATION LIST

Patent Literature

Patent Literature 1 Japanese Unexamined Patent Application Publication No. 2002-36905

SUMMARY OF INVENTION

Problem to be Solved by the Invention

The related art technique has the following problems. The detected value of the steering angle sensor is A/D converted by an arithmetic control device. In general, however, since the LSB (Least Significant Bit) of the detected value of the steering angle sensor is comparatively coarse, the detected value of the steering angle sensor may fall below the resolution of the A/D converter depending on a traveling state. In this case, the estimation accuracy of the driving state of the driver may be deteriorated.

It is an object of the invention to provide a driver state estimation device capable of improving the estimation accuracy of the driving state of the driver.

Means for Solving the Problem

A driver state estimation device for estimating a driving state of a driver on the basis of a steering operation state according to an aspect of the invention includes a steering angle detection unit detecting a steering angle of the steering, a steering torque detection unit detecting steering torque applied to the steering, and a steering angle estimation unit estimating the steering angle of the steering on the basis of the steering torque detected by the steering torque detection unit when the steering angle detected by the steering angle detection unit is smaller than a predetermined value.

With this aspect, if the steering angle detected by the steering angle detection unit is smaller than the predetermined value, the steering angle of the steering is estimated on the basis of the steering torque detected by the steering torque detection unit. For this reason, for example, even when the actual steering angle of the steering during straight-through traveling is very small, the steering angle is estimated from the steering torque. Therefore, the estimation accuracy of the driving state of the driver can be improved.

The steering angle estimation unit may estimate the steering angle of the steering by multiplying the steering torque detected by the steering torque detection unit by a coefficient. The steering angle of the steering is substantially proportional to the steering torque. Therefore, the steering angle can be easily and reliably estimated by multiplying the steering torque by the coefficient.

When the value of the steering angle detected by the steering angle detection unit has changed, the steering angle estimation unit may estimate the steering angle of the steering on the basis of the steering torque with the value of the relevant steering angle as an initial value. In this case, even if the steering angle detected by the steering angle detection unit is larger than the predetermined value, the steering angle which is substantially proportional to the steering torque can be estimated from the steering torque.

Effect of the Invention

According to the invention, the estimation accuracy of the driving state of the driver can be improved. As a result, a degree of arousal or the like of the driver during traveling can be accurately determined.

REFERENCE SINGS LIST

1: DRIVER STATE ESTIMATION DEVICE
2: STEERING ANGLE SENSOR
3: STEERING TORQUE SENSOR
4: ECU
5: STEERING ANGLE ESTIMATION UNIT
6: DRIVER STATE ESTIMATION UNIT

DESCRIPTION OF EMBODIMENTS

Hereinafter, an exemplary embodiment of a driver state estimation device according to the invention will be described in detail with reference to the drawings.

Figure 1:
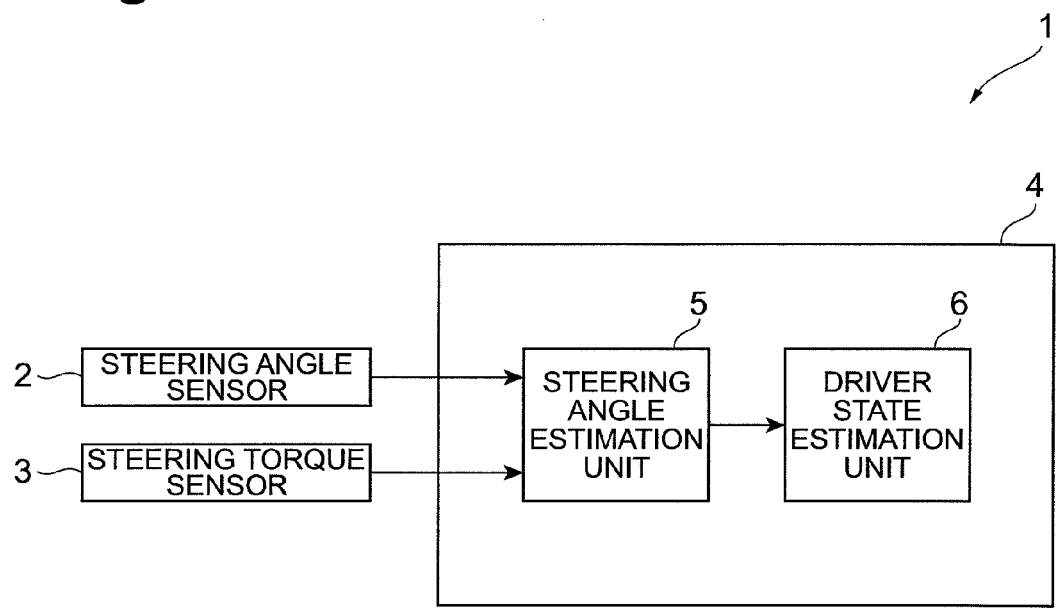
FIG. 1 is a diagram showing the schematic configuration of a driver state estimation device according to an embodiment of the invention.

FIG. 1 is a diagram showing the schematic configuration of a driver state estimation device according to an embodiment of the invention. In FIG. 1, the driver state estimation device 1 of this embodiment includes a steering angle sensor 2 (steering angle detection unit) detecting a steering angle of a steering (not shown), a steering torque sensor 3 (steering torque detection unit) detecting steering torque applied to the steering, and an ECU (Electronic Control Unit) 4 connected to the steering angle sensor 2 and the steering torque sensor 3.

The ECU 4 includes a CPU, a memory, such as a ROM or a RAM, an input/output circuit, such as an A/D converter, and the like. The ECU 4 has a steering angle estimation unit 5 (steering angle estimation unit) and a driver state estimation unit 6.

The steering angle estimation unit 5 estimates the steering angle of the steering on the basis of at least one of the steering angle detected by the steering angle sensor 2 and the steering torque detected by the steering torque sensor 3.

The driver state estimation unit 6 estimates a driving state (falling asleep or the like while driving) of a driver on the basis of the estimation result of the steering angle estimation unit 5. For example, the driver state estimation unit 6 compares a standard deviation of the steering angle estimated by the steering angle estimation unit 5 with a threshold value, and if the standard deviation of the steering angle exceeds the threshold value, estimates that the driver feels sleepy.

Figure 2:
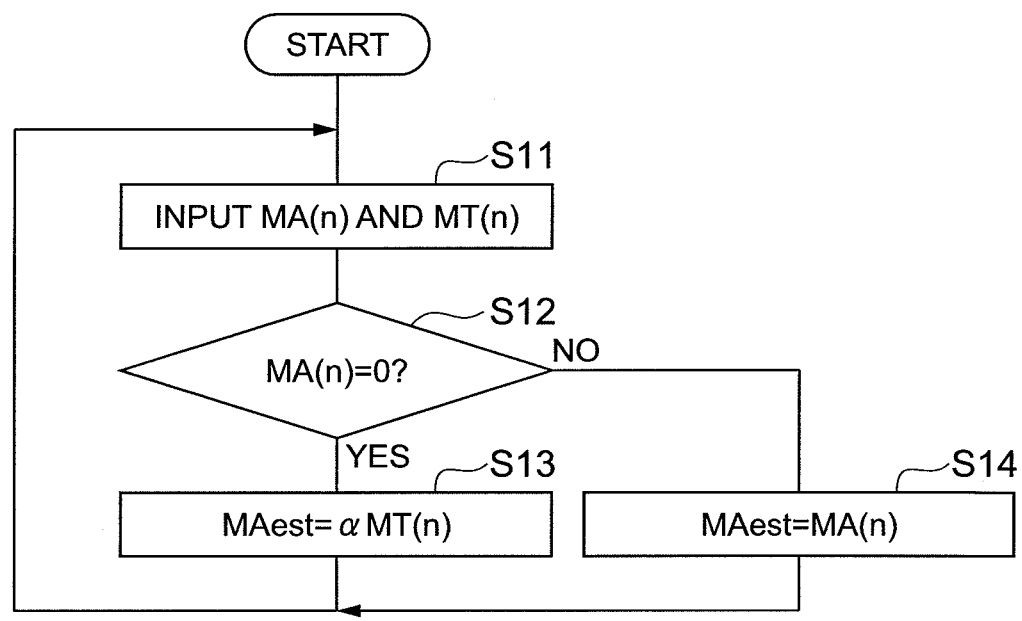
FIG. 2 is a flowchart showing the details of a steering angle estimation processing procedure which is executed by a steering angle estimation unit shown in FIG. 1.

FIG. 2 is a flowchart showing the details of a steering angle estimation processing procedure which is executed by the steering angle estimation unit 5.

In FIG. 2, first, the steering angle (steering angle detected value) MA detected by the steering angle sensor 2 and the steering torque (steering torque detected value) MT detected by the steering torque sensor 3 are input (Step S11). At this time, the steering angle detected value MA and the steering torque detected value MT are A/D converted by the A/D converter and then input to the CPU.

Figure 3:
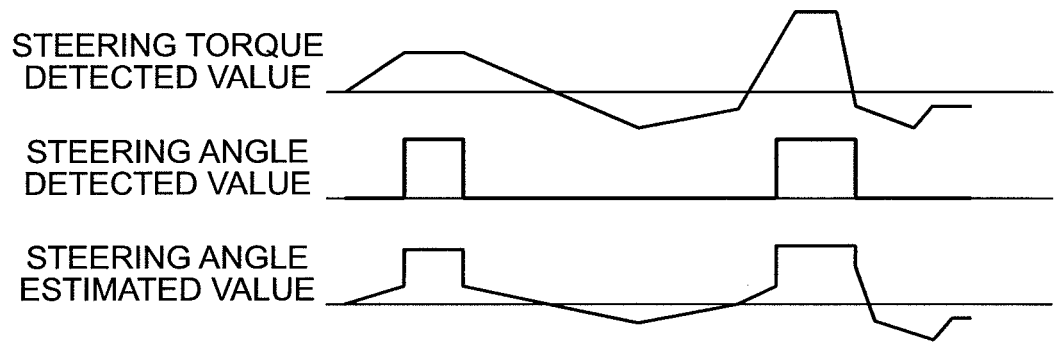
FIG. 3 is a timing chart showing a steering angle estimated value obtained by the steering angle estimation processing procedure shown in FIG. 2, together with an example of a steering angle detected value and a steering torque detected value.

FIG. 3 shows an example of the steering angle detected value MA and the steering torque detected value MT after being A/D converted. FIG. 3 shows an example where a vehicle is traveling straight through on a highway and a state where the steering slightly swerves sometimes. In a state where a vehicle is traveling straight through, the steering angle detected value MA becomes 0.

After Step S11, it is determined whether or not the steering angle detected value MA is 0 (Step S12). When it is determined that the steering angle detected value MA is 0, the steering angle estimated value MAest is calculated on the basis of the steering torque detected value MT (Step S13). Then, the process returns to Step S11.

Figure 4:
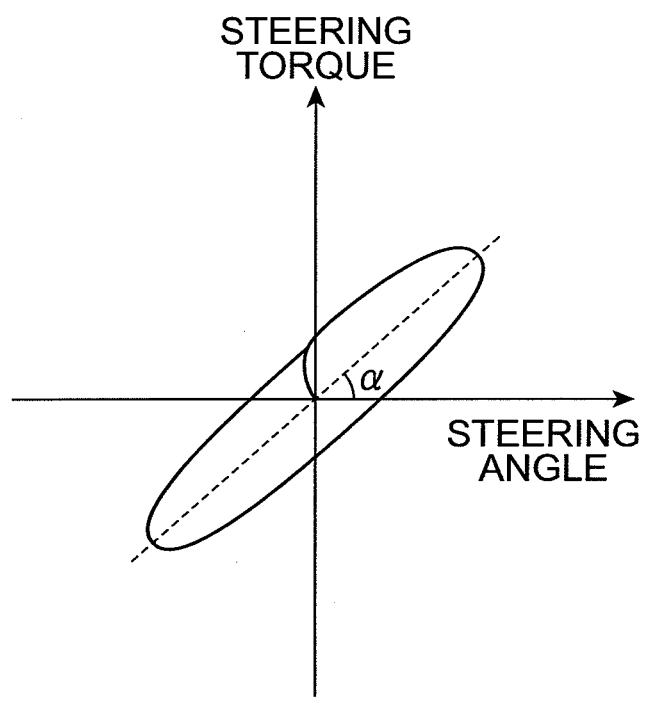
FIG. 4 is a graph showing a relationship between a steering angle and steering torque.

Specifically, as shown in FIG. 4, the steering angle of the steering is substantially proportional to the steering torque. Thus, the gradient (proportionality coefficient) α of the steering angle with respect to the steering torque is defined in advance. Then, the steering angle estimated value MAest is calculated by Expression (A).

$$MAest = \alpha \times MT \tag{A}$$

When it is determined in Step S12 that the steering angle detected value MA is not 0, the steering angle detected value MA is set to the steering angle estimated value MAest (Step S14). Then, the process returns to Step S11.

With such a steering angle estimation processing procedure, if the steering angle detected value MA and the steering torque detected value MT shown in FIG. 3 are input, the steering angle estimated value MAest shown in FIG. 3 is obtained.

While a normal driver swerves the steering no more than 2 degrees during straight-through traveling, the LSB (Least Significant Bit) of the steering angle detected by the steering angle sensor 2 is 1.5 degrees, which is coarse. The LSB is conceptually the synonym of the quantization unit of A/D conversion. For this reason, during straight-through traveling, the steering angle detected by the steering angle sensor 2 is likely to fall below the resolution of the A/D converter, so it is difficult to accurately measure the steering angle by the steering angle sensor 2. As also shown in FIG. 3, the LSB of the steering torque detected by the steering torque sensor 3 is much finer than the LSB of the steering angle detected by the steering angle sensor 2.

Accordingly, in this embodiment, when the steering angle detected value MA is 0, the steering angle estimated value MAest is calculated by multiplying the steering torque detected value MT by the proportionality coefficient α. Therefore, even when the actual steering angle of the steering is smaller than the LSB of the steering angle detected by the steering angle sensor 2, the steering angle at that time can be estimated. As a result, the driving state, such as falling asleep, of the driver during traveling can be estimated with high accuracy, regardless of the traveling state.

Although in this embodiment, when the steering angle detected value MA is 0, the steering angle estimated value MAest is calculated by multiplying the steering torque detected value MT by the proportionality coefficient α, for example, such calculation may be performed when the steering angle detected value MA is smaller than the LSB (falls below the resolution of the A/D converter).

Figure 5:
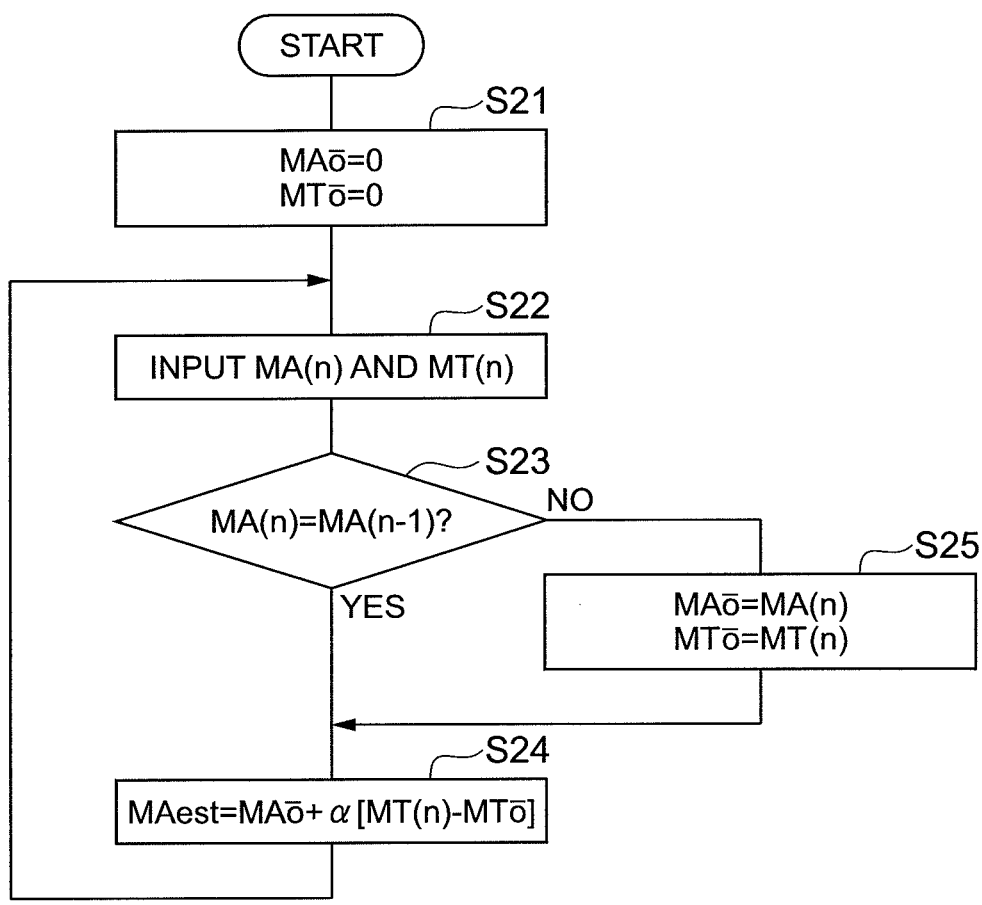
FIG. 5 is a flowchart showing the details of another steering angle estimation processing procedure which is executed by the steering angle estimation unit shown in FIG. 1.

FIG. 5 is a flowchart showing the details of another steering angle estimation processing procedure which is executed by the steering angle estimation unit 5.

In FIG. 5, first, a steering angle detected value $MA_O$ and a steering torque detected value $MT_O$ are initially set to 0 (zero) (Step S21). The steering angle detected value $MA_O$ is a relevant value when the steering angle detected value MA has changed, and the steering torque detected value $MT_O$ is the steering torque detected value MT when the steering angle detected value MA has changed.

Subsequently, similarly to Step S11 shown in FIG. 2, the steering angle detected value MA and the steering torque detected value MT are input (Step S22).

Figure 6:
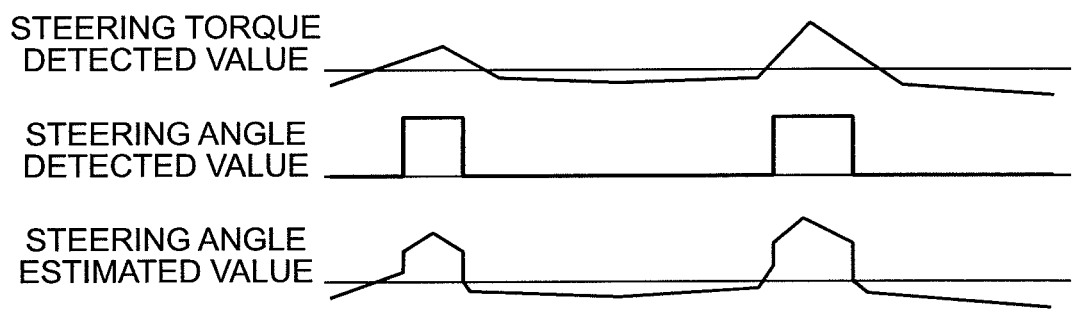
FIG. 6 is a timing chart showing a steering angle estimated value obtained by the steering angle estimation processing procedure shown in FIG. 5, together with another example of a steering angle detected value and a steering torque detected value.

FIG. 6 shows another example of the steering angle detected value MA and the steering torque detected value MT after being A/D converted. Similarly to FIG. 3, FIG. 6 shows an example where the vehicle is traveling straight through on a highway and a state where the steering slightly swerves sometimes.

After Step S22, it is determined whether or not the currently input steering angle detected value MA(n) is identical to the previously input steering angle detected value MA(n−1) (Step S23). When it is determined that the currently input steering angle detected value MA(n) is identical to the previously input steering angle detected value MA(n−1), the steering angle estimated value MAest is calculated by Expression (B) on the basis of the current steering angle detected value $MA_O$ and steering torque detected value $MT_O$ and the currently input steering torque detected value MT(n) (Step S24). Then, the process returns to Step S22.

$$MAest = MA_O + \alpha \times [MT(n) - MT_O] \tag{B}$$

Specifically, the steering angle estimated value MAest is calculated by adding the current steering angle detected value $MA_O$ and a value obtained by multiplying the difference between the currently input steering torque detected value MT(n) and the current steering torque detected value $MT_O$ by the proportionality coefficient α.

When it is determined in Step S23 that the currently input steering angle detected value MA(n) is not identical to the previously input steering angle detected value MA(n−1), the currently input steering angle detected value MA(n) is set as a new steering angle detected value $MA_O$, and the currently input steering angle detected value MT(n) is set as a new steering angle detected value $MT_O$ (Step S25). Then, the steering angle estimated value MAest is calculated by Expression (B) on the basis of the new steering angle detected value $MA_O$ and steering angle detected value $MT_O$ (Step S24). The steering angle estimated value MAest at that time becomes the currently input steering angle detected value MA(n) from Expression (B).

With such a steering angle estimation processing procedure, if the steering angle detected value MA and the steering torque detected value MT shown in FIG. 6 are input, the steering angle estimated value MAest shown in FIG. 6 is obtained.

In this processing procedure, the steering angle estimated value MAest is calculated by using the steering torque detected value MT, regardless of the magnitude of the steering angle detected value MA. At this time, if the steering angle detected value MA changes, the steering angle estimated value MAest is calculated on the basis of the steering torque detected value MT with the steering angle detected value MA as an initial value. Therefore, similarly to the above description, even when the actual steering angle of the steering is very small, the steering angle at that time can be estimated.

The invention claimed is:

1. A driver state estimation device for estimating a driving state of a driver on the basis of a steering operation state, the device comprising:
   a steering angle detection unit detecting a steering angle of the steering;
   a steering torque detection unit detecting steering torque applied to the steering; and
   a steering angle estimation unit estimating the steering angle of the steering on the basis of the steering torque detected by the steering torque detection unit when the steering angle detected by the steering angle detection unit is smaller than a predetermined value; and
   an A/D converter for A/D converting the steering angle detected by the steering angle detection unit, wherein
   the predetermined value is a value corresponding to a resolution of the A/D converter.

2. The device according to claim 1,
   wherein the steering angle estimation unit estimates the steering angle of the steering by multiplying the steering torque detected by the steering torque detection unit by a coefficient.

3. The device according to claim 1,
   wherein, when the value of the steering angle detected by the steering angle detection unit has changed, the steering angle estimation unit estimates the steering angle of the steering on the basis of the steering torque with the changed value of the steering angle as an initial value.

4. The device according to claim 2,
   wherein, when the value of the steering angle detected by the steering angle detection unit has changed, the steering angle estimation unit estimates the steering angle of the steering on the basis of the steering torque with the changed value of the steering angle as an initial value.

5. The device according to claim 1, wherein the steering angle estimation unit determines whether the steering angle detected by the steering angle detection unit is smaller than the predetermined value, and estimates the steering angle of the steering on the basis of the steering torque detected by the steering torque detection unit when the steering angle detected by the steering angle detection unit is determined to be smaller than the predetermined value.

* * * * *